United States Patent
Kuehni et al.

(10) Patent No.: US 11,757,998 B2
(45) Date of Patent: Sep. 12, 2023

(54) METHODS AND SYSTEMS CONFIGURED FOR DISTRIBUTION OF VR/MR/AR/XR CONTENT TO END USER DEVICES VIA LOGICAL RELATIONSHIPS AND RELATED MANAGEMENT OF END USER DEVICES

(71) Applicant: PixoVR, Corp., Royal Oak, MI (US)

(72) Inventors: Todd C. Kuehni, Royal Oak, MI (US); Cengiz Terzibas, Royal Oak, MI (US); Scott Oliverio, Royal Oak, MI (US); Sean Hurwitz, Royal Oak, MI (US)

(73) Assignee: PIXOVR, CORP, Berkley, MI (US)

( * ) Notice: Subject to any disclaimer, the term of this patent is extended or adjusted under 35 U.S.C. 154(b) by 0 days.

(21) Appl. No.: 17/790,212

(22) PCT Filed: Dec. 31, 2020

(86) PCT No.: PCT/US2020/067632
§ 371 (c)(1),
(2) Date: Jul. 5, 2022

(87) PCT Pub. No.: WO2021/141821
PCT Pub. Date: Jul. 15, 2021

(65) Prior Publication Data
US 2023/0059847 A1    Feb. 23, 2023

Related U.S. Application Data

(60) Provisional application No. 62/957,597, filed on Jan. 6, 2020.

(51) Int. Cl.
*G06F 15/16* (2006.01)
*H04L 67/131* (2022.01)
*H04L 67/50* (2022.01)

(52) U.S. Cl.
CPC .......... *H04L 67/131* (2022.05); *H04L 67/535* (2022.05)

(58) Field of Classification Search
CPC ........................... H04L 67/131; H04L 67/535
(Continued)

(56) References Cited

U.S. PATENT DOCUMENTS 9,380,177 B1    6/2016    Rao et al.
10,353,474 B2 *  7/2019    Sharma .................. G06F 3/017
(Continued)

OTHER PUBLICATIONS

Latoschik et al. "Not alone here?! scalability and user experience of embodied ambient crowds in distributed social virtual reality." IEEE transactions on visualization and computer graphics 25.5 (2019); 2134-2144. Feb. 17, 2019 (Feb. 17, 2019) Retrieved on Feb. 25, 2021 (Feb. 25, 2021) from <https://ieeexplore.ieee.org/abstract/document/8643417> entire document.

*Primary Examiner* — Moustafa M Meky
(74) *Attorney, Agent, or Firm* — Varnum LLP

(57) ABSTRACT

A method to distribute and manage virtual reality (VR) content among a plurality of headsets can be provided by receiving VR experience configuration information from an administrator of a VR experience including VR content module information identifying the VR content modules to be executed during the VR experience, transmitting information over a network responsive to the VR experience configuration information to a plurality of headsets to operate the plurality of headsets as part of the VR experience subject to operating limitations of the VR content identified by the VR content module information, receiving information from the plurality of headsets relating to operation of the VR experience and, monitoring the information relating to operation of the VR experience relative to the limitations of the VR content identified by the VR content module information.

20 Claims, 5 Drawing Sheets

(58) Field of Classification Search
USPC .......................................................... 709/203
See application file for complete search history.

(56) References Cited

U.S. PATENT DOCUMENTS

| | | | |
|---|---|---|---|
| 10,773,169 B2* | 9/2020 | Leeper | G06V 20/20 |
| 10,817,066 B2* | 10/2020 | Ross | H04L 67/131 |
| 10,976,830 B2* | 4/2021 | Sharma | G06F 9/541 |
| 11,426,663 B2* | 8/2022 | Leeper | G06V 10/24 |
| 11,493,999 B2* | 11/2022 | Harviainen | H04N 7/157 |
| 11,595,381 B2* | 2/2023 | Szafranski | G06F 21/32 |
| 2008/0172680 A1 | 7/2008 | Gyorfi et al. | |
| 2014/0280502 A1 | 9/2014 | Cronin | |
| 2016/0191893 A1 | 6/2016 | Gewickey et al. | |
| 2017/0078447 A1 | 3/2017 | Hancock et al. | |
| 2017/0090589 A1* | 3/2017 | Sharma | G06Q 30/0641 |
| 2018/0157333 A1* | 6/2018 | Ross | G06F 3/013 |
| 2019/0005717 A1* | 1/2019 | Singh | G06T 15/80 |
| 2019/0224572 A1* | 7/2019 | Leeper | G06T 19/006 |
| 2019/0294255 A1* | 9/2019 | Sharma | G06Q 30/0641 |
| 2020/0142664 A1* | 5/2020 | Dantrey | G06F 3/165 |
| 2020/0391115 A1* | 12/2020 | Leeper | G06F 3/011 |
| 2021/0240279 A1* | 8/2021 | Harviainen | H04L 67/131 |
| 2023/0032824 A1* | 2/2023 | Harviainen | H04L 67/131 |

* cited by examiner

LOGICAL CHILD FLEET 2

| HEADSET ID | USERNAME | AUTHENTICATION | MODULES | LICENSES |
|---|---|---|---|---|
| ⋮ | | | | |

FIG. 3

METHODS AND SYSTEMS CONFIGURED FOR DISTRIBUTION OF VR/MR/AR/XR CONTENT TO END USER DEVICES VIA LOGICAL RELATIONSHIPS AND RELATED MANAGEMENT OF END USER DEVICES

CLAIM FOR PRIORITY

The present application is a Section 371 U.S. National Phase of International Application No. PCT/US2020/067632, filed on Dec. 31, 2020, which claims priority to U.S. Provisional Patent Application No. 62/957,597, titled Methods And Systems Configured For Distribution Of VR/MR/AR/XR Content To End User Devices Via Logical Relationships And Related Management Of End User Devices, filed in the United States Patent and Trademark Office on Jan. 6, 2020. The entire disclosure of each of International Application No. PCT/US2020/067632 and U.S. Provisional Patent Application No. 62/957,597 are incorporated herein by reference.

FIELD

The present invention relates to the field of extended reality in general.

BACKGROUND

Extended Reality (XR) can include the subsets that are commonly referred to as Virtual Reality (VR), Mixed Reality, Augmented Reality (AR). XR solutions may be dependent on the availability of customized XR content that allows users to experience applications in the areas for example as safety training in electrical power systems maintenance and repair, construction site safety training, etc. Further, it can be a challenge to manage the distribution of XR content to a fleet of display devices (such as a head-mounted display) that allow user to experience the particular application provided by the content.

SUMMARY

Embodiments according to the invention can provide methods and systems configured for distribution of VR/MR/AR/XR content to end user devices via logical relationships and related management of end user devices. Pursuant to these embodiments, a method to distribute and manage virtual reality (VR) content among a plurality of headsets can be provided by receiving VR experience configuration information from an administrator of a VR experience including VR content module information identifying the VR content modules to be executed during the VR experience, transmitting information over a network responsive to the VR experience configuration information to a plurality of headsets to operate the plurality of headsets as part of the VR experience subject to operating limitations of the VR content identified by the VR content module information, receiving information from the plurality of headsets relating to operation of the VR experience and, monitoring the information relating to operation of the VR experience relative to the limitations of the VR content identified by the VR content module information.

Other embodiments are also disclosed herein.

BRIEF DESCRIPTION OF THE DRAWINGS

FIG. 3 is a detailed schematic illustration of the data maintained in the administrator VR experience database shown in FIG. 2 in some embodiments according to the invention.

DETAILED DESCRIPTION OF EMBODIMENTS ACCORDING TO THE INVENTION

Figure 1:
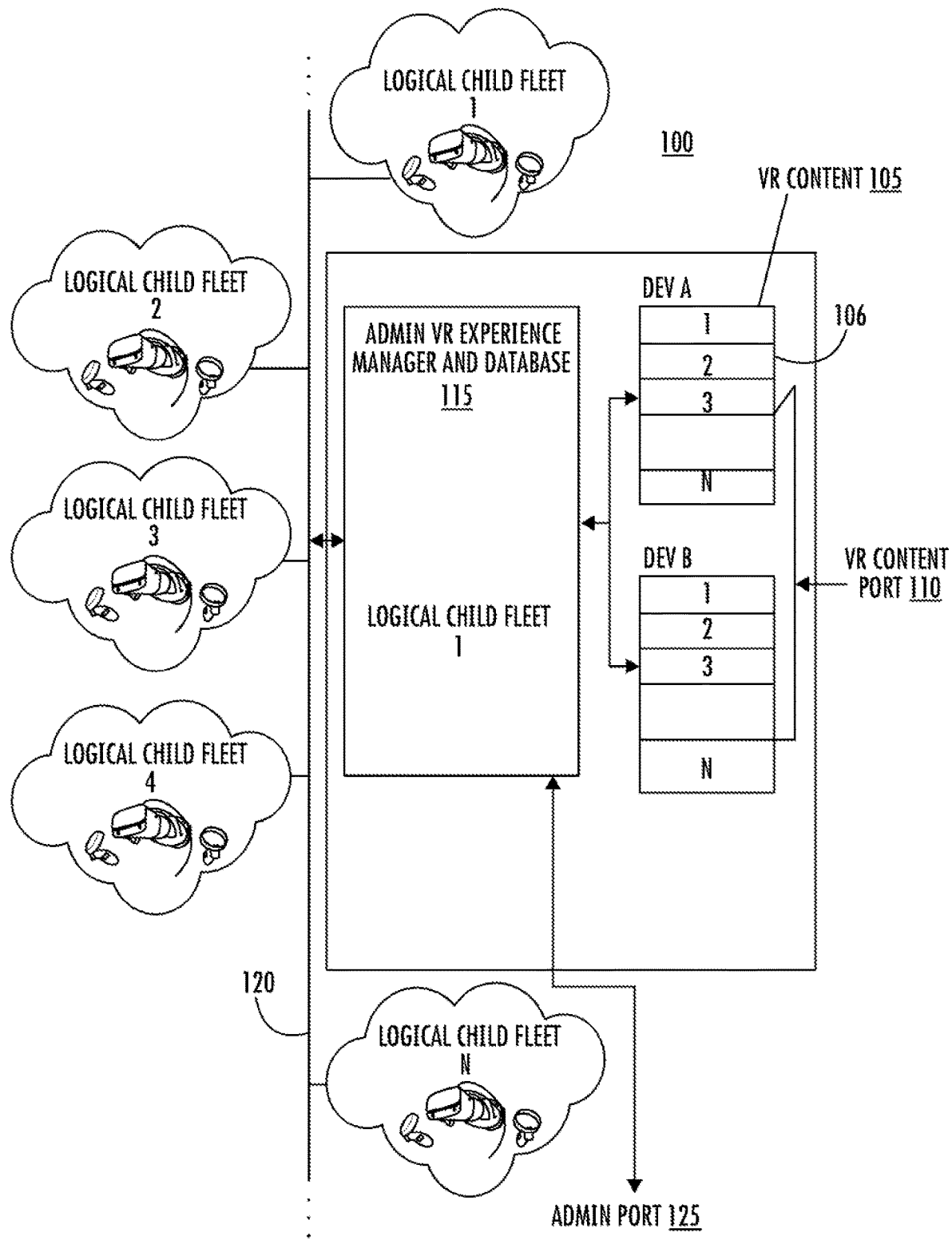
FIG. 1 is a block diagram illustrating a system including an administrator VR experience manager and database that is configured to provide distribution and management of VR content to fleets of headsets organized into hierarchical logical relationships to provide multi-participant VR experiences to users in some embodiments according to the invention.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, systems and methods according to the present invention can provide for the distribution (and operation) of VR content to a fleet of VR headsets, which can be administered by a third party (i.e., an administrator) who can be a party other than those that operate the system itself. Further, the administrator can utilize the system to, for example, select among a variety of VR content modules for distribution to the fleet of headsets to provide a VR experience (such as a VR based training). The distribution can include, for example, pre-authorizing particular users of the headsets, selecting the relevant modules from a library of VR content, and enabling particular headsets for operation by the particular users.

Still further, the system may allow for the operations between the administrator and the end users in a hierarchical logical relationship. In some embodiments, the administrator can function as the parent in the hierarchical logical relationship whereas the end user of the headset may operate within the child in the hierarchical logical relationship. For example, the child may be defined to include a logical group of end users that require a certain type of VR training, that may in-turn, require an associated license to operate within the VR training experience. Still further, the administrator may operate as the logical parent to a number of different logical children. For example, the administrator may operate different VR experiences for a number of different groups of end users, each group of which can operate as a distinct logical child. Accordingly, the administrator can configured the different groups of users as different logical children to maintain, for example, different licensing for the different logical children groups (as the groups may utilize different VR content). Still further, the different logical children groups can be in different organizations and/or different business entities where the members of the different groups of logical children may be geographically groups together or in different geographic locations.

As used herein the term "virtual reality" is used to generally refer to the operation of embodiments according to the invention. It will be understood, however, that embodiments according to the present invention can be applicable to other areas such as mixed reality and/or augmented reality, which may be referred to collectively as "extended reality." It will be further understood that the systems described herein can be configured to be operatively coupled to a plurality of display devices (sometimes referred to as a "fleet"), each of which can be configured to support a particular type of experience. In some embodiments, the display devices may be headsets, but it will be understood that embodiments according to the invention are not limited to "headsets" and may be implemented with any display device that allows the user to effectively participate in the VR experience.

When a headset is described as operating in a system herein, the headset can support the particular experience provided by the system. For example, in some embodiments, a system can support a mixed fleet of AR headsets, VR, headsets, and MR headsets, each of the headsets can be configured to provide a particular type of experience. In still other embodiments, a system may support headsets that have a range of features. For example, is some embodiments, a headset may support a subset of the following: broadcasting the user's biometric data to the system, displaying other user's biometric data, retina scanning for identification or login, retina tracking for control or input to the systems, user audio input to the system, and other biometric data.

In some embodiments the fleets of headsets described herein can represent a mixed fleet of headsets where some headsets or have virtual reality capability while others have a mixed reality or augmented reality capability. Accordingly, the term virtual reality is not used herein in a limiting sense but only to illustrate the particular embodiments described. Those of ordinary skill in the art will understand that the concepts described herein can be applied to areas other than VR when given the benefit of the present disclosure.

The VR headset can be, for example, an Oculus Quest headset marketed by Facebook Technologies, Inc. at quest.com. It will be understood that the use of the term headset includes associated controllers, such as an Oculus Touch Controller, also marketed by Facebook Technologies, Inc. at quest.com. Other headsets or displays may also be used (either as a group or as part of a mixed group of headsets utilized by end users for a VR experience).

FIG. 1 is a block diagram illustrating a system 100 including an administrator VR experience manager and database 115 that is configured to provide distribution and management of VR content to fleets 1-N of headsets organized into hierarchical logical relationships to provide multiparticipant VR experiences to users in some embodiments according to the invention. According to FIG. 1 VR content can be developed by 3rd party content developers or publishers which can then be uploaded to the system in managed and distributed by the administrator VR experience manager and database 115. In particular, the VR content can be uploaded via the VR port 110 and stored in the administrator VR experience manager and database 115 in tables 106-N identifying the developer and VR module. For example table 106 shows that developer a has modules 1-N stored in the database 115 whereas developer Z has uploaded modules 1-N. It will be understood that this VR content uploaded by developers can be subject to terms of use and provisioned to the fleets of headsets shown in FIG. 1 so that the administrator VR experience manager and database 115 can create VR experiences for the users of each of those fleets headsets. It will be understood that the system 100 can be implemented in a cloud based environment as a series of virtual servers to provide the operations described herein.

As further shown in FIG. 1 the administrator VR experience manager and database 115 is also coupled to a network 120 that provides access to the fleets of headsets 1-N that can be managed via the database 115. In particular, the system 100 and the fleets of headsets 1-N can be hierarchically organized into different child/parent relationships wherein the VR content is made available for execution on the headsets based on which fleet the headset is include in and the terms or use for the VR module stored in the database. For example, if a VR experience to be provided by the administrator VR experience manager and database 115 requires module 1 from developer A, the database can authorize the module to be downloaded and executed by the headsets in the fleet that is to be provided with the particular experience. The database also records the usage of the module by the headsets so as to reconcile the module use with the terms of use associated with that module.

Still referring to FIG. 1 it will be understood that the fleets of headsets in the logical child fleets 1-N can be in the same geographic location (such as in a single facility or room). In some embodiments, the headsets in the fleet can be geographically distributed (such as at different facilities or in different rooms) but are represented in the VR experience as being co-located with one another such that, for example, the users can interact with each other in the VR experience in a way that would not be otherwise possible, such as communicating with visible signals or spoken communications in real-time. It will be further understood that communications between users (i.e., peer-to-peer communications) can be provided via the VR experience manager and database 115. For example, if a message is transmitted from a first user headset to a second user headset the message can be transmitted from the first user headset over the network 120 to VR experience manager and database 115. The VR experience manager and database 115 can then transmit the message back over the network 120 to the second user headset. It will be further understood that this communication protocol can be used despite the fact that the first and second user headsets are co-located (at the same location) or are in different locations. It will be further understood in some embodiments, communications can be provided directly between user headsets without being transmitted to/from the VR experience manager and database 115. In still further embodiments, the communications can be provided by a combination of the above approaches.

Figure 2:
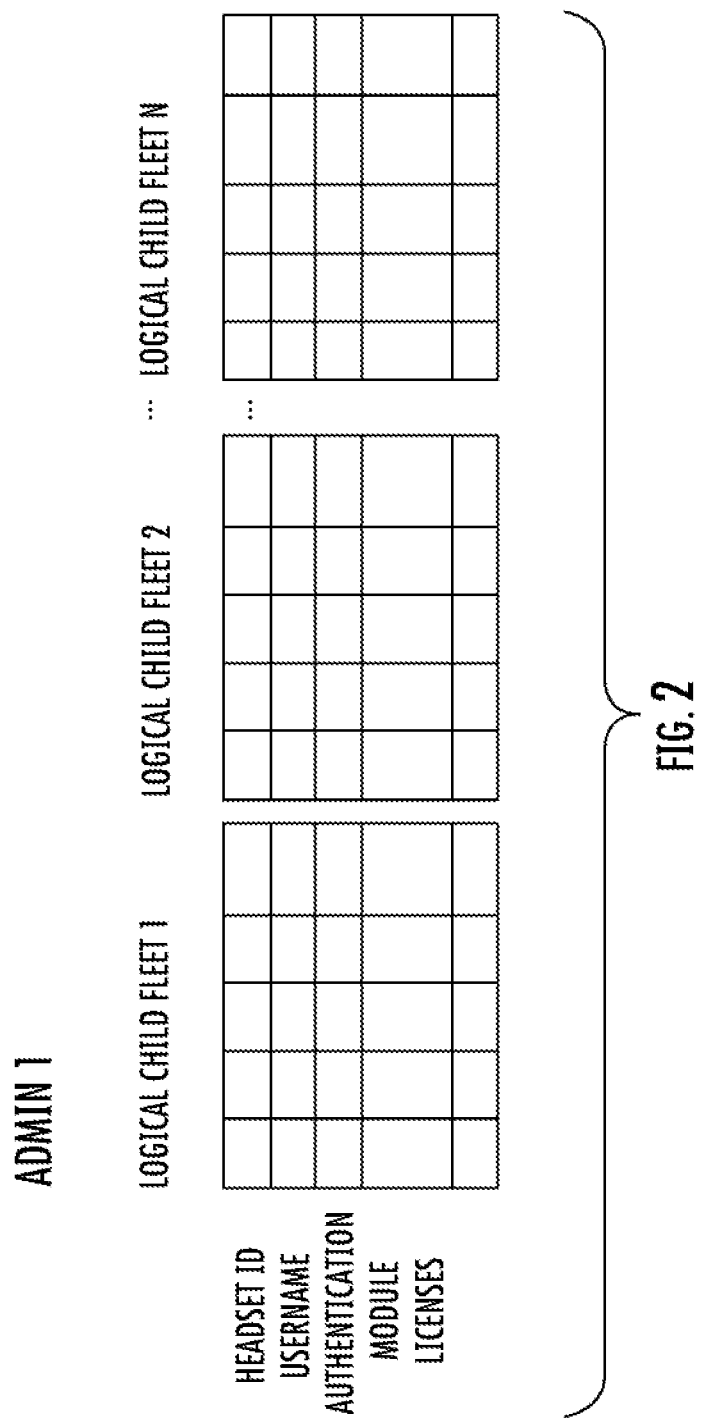
FIG. 2 is schematic representation of the database included in the administrator VR experience manager and database of FIG. 1 that is configured to assemble the headsets into the fleets shown in FIG. 1 organized into hierarchical logical relationships showing the VR modules for each headset, user login and authorization information, and terms of use for each module in some embodiments according to the invention.

FIG. 2 is schematic representation of the database included in the administrator VR experience manager and database of FIG. 1 that is configured to assemble the headsets into the fleets shown in FIG. 1 organized into hierarchical logical relationships showing the VR modules for each headset, user login and authorization information, and terms of use for each module and tracking in some embodiments according to the invention. In particular, FIG. 2 shows database entries for the logical child relationships for headset fleets 1-N of FIG. 1 including the headset ID, the username associated with the headset user (such as an email), the password for the user of the headset, the VR content modules that are licensed for execution on the headset for providing the VR experience associated with LCF1 (FIG. 1). As further shown in FIG. 2, each of the logical child fleets can have an associated portion of the database that provides the information for each headset in the fleet included in the particular logical child fleet. Accordingly, the database 115 can configure a particular headset to be included in a logical child fleet that is intended to provide a VR experience.

FIG. 3 is a more detailed schematic illustration of the data maintained in the administrator VR experience database shown in FIG. 2 in some embodiments according to the invention. In particular FIG. 2 illustrates that the table can include an entry for each headset that is to be included in a logical child fleet for a VR experience. For example, if a logical child fleet includes 64 headsets for particular VR experience, the table shown in FIG. 3 would include 64 entries (one for each headset) along with the information described above to enable the particular headset to operate within the logical child fleet to support the VR experience.

Figure 4:
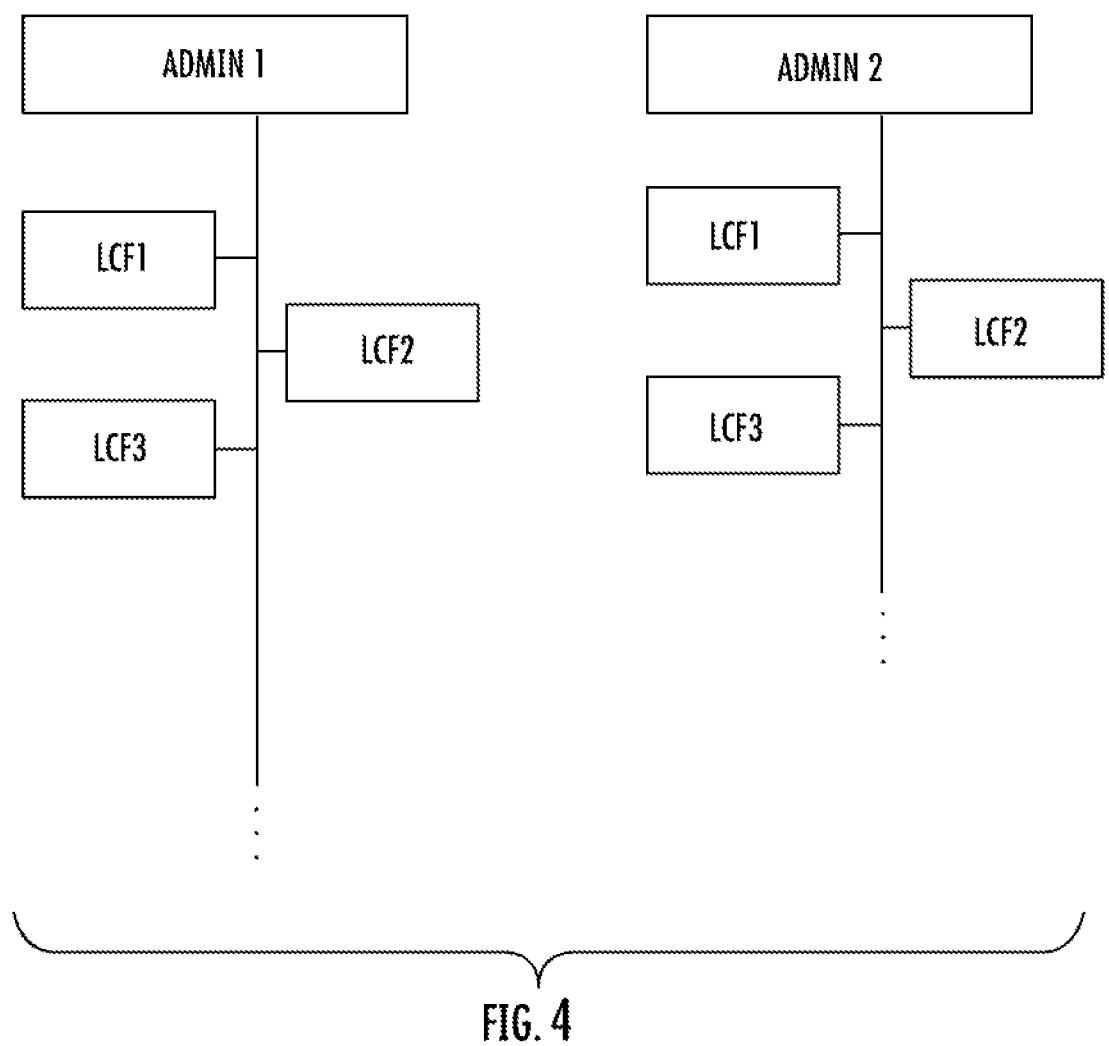
FIG. 4 is a block diagram illustrating administrators and respective plurality of VR headset fleets organized into hierarchical parent/child logical relationships to provide a multi-participant VR experience to users in some embodiments according to the invention.

FIG. 4 is a block diagram illustrating administrators 1-2 and a respective plurality of VR headset fleets organized into hierarchical parent/child logical relationships for each administrator 1-2 to provide a multi-participant VR experiences to users in some embodiments according to the invention. According to FIG. 4, administrator 1 has used the administrator port 125 of the system 100 in FIG. 1 to configure a number of headsets to be included in a child 1 logical fleet to support the execution of a first VR experience by enabling those headset to run the VR modules (from the system 100) that provide the first VR experience. Still further, Administrator 1 has also configured logical child fleets 2 and N to include respective sets of headsets that may be licensed with other VR content modules to support second and third VR experiences respectively. It will be further understood that Administrator 2 can function independent of Administrator to support other VR experiences using the same operations described above. It will be further understood that the Admins can also receive information from the headsets during operation of the VR experiences, such as information indicating whether the user passed an evaluation provided by the VR experience, biometric data associated with the user during the VR experience, etc. It will be further understood that of the headsets may broadcast biometric information to the Administrator which may then be transmitted to the other user headsets in the same VR experience. In some embodiments, the biometric information is broadcast directly to the other headset. It will be further understood that the Admins may relay the data collected during the VR experience to the system 100 for updating within the database 115 so that the terms of usage associated with the VR modules under execution can be monitored for compliance.

In some embodiments, the Admins can be what is sometimes referred to as a "reseller" of the headsets that may provide the headsets to the end users having a particular need for a VR experience, such as assembly or safety training to replace a traditional training model. Under such an approach the reseller may be given access to the administrator port 125 of the system 100 whereupon the administrator can configure the VR experience by provisioning the appropriate VR content to the logical grouping (i.e., the child) of the headsets that are to be used for the training. It will be further understood that the administrator can configured multiple logical groups of headsets to provide respective VR experiences, each of which may be provisioned with different VR content depending on the training. Still further, the VR content modules to be used in the VR experience can operate subject to particular terms and licenses set for the VR content module such as the number of times the VR content can be executed, the number of users that may access the VR content over a particular time frame etc. If a term of usage is not consented to or violated the particular headset (or headsets) may be dropped from the logical group taking part in the VR training.

Figure 5:
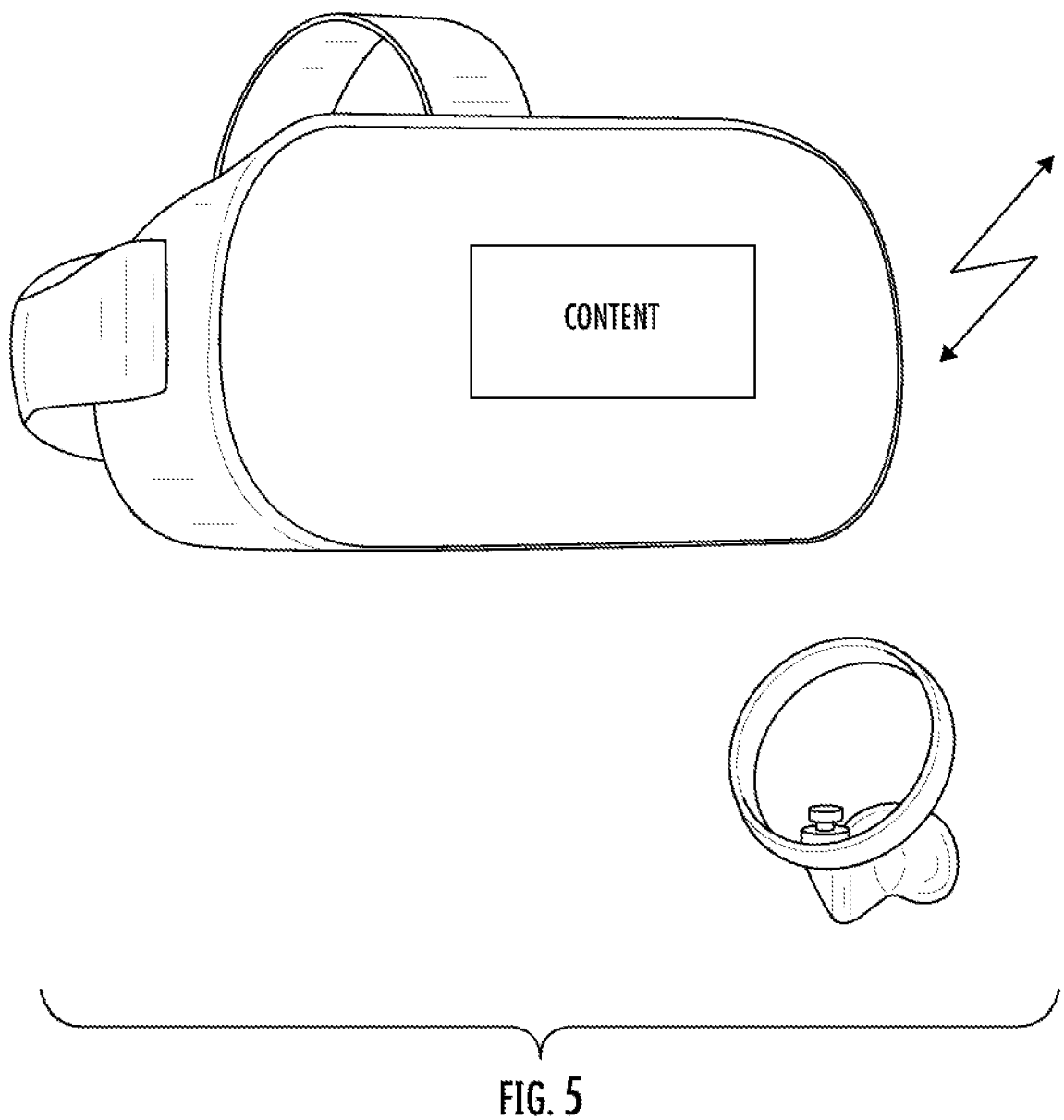
FIG. 5 is schematic representation of a headset and associated controller configured to operate within the system of FIG. 1 including a display of the headset providing a graphical representation of VR content distributed by the system in some embodiments according to the invention.

FIG. 5 is schematic representation of a headset and associated controller configured to operate within the system of FIG. 1 including a display of the headset providing a graphical representation of VR content distributed by the system in some embodiments according to the invention. According to FIG. 5 the display of the headset may show the VR content made available to the user for the supported VR experiences.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a" "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

What is claimed:

1. A method to distribute and manage virtual reality (VR) content among a plurality of headsets, the method comprising:
   receiving VR experience configuration information from an administrator of a VR experience including VR content module information identifying the VR content modules to be executed during the VR experience;
   transmitting information over a network responsive to the VR experience configuration information to a plurality of headsets to operate the plurality of headsets as part of the VR experience subject to operating limitations of the VR content identified by the VR content module information;
   receiving information from the plurality of headsets relating to operation of the VR experience; and
   monitoring the information relating to operation of the VR experience relative to the limitations of the VR content identified by the VR content module information.

2. A method to distribute and manage virtual reality (VR) content among a plurality of headsets, the method comprising:
   organizing a plurality of first headsets into a first hierarchical logical relationship;
   organizing a plurality of second headsets into a second hierarchical logical relationship;

transmitting information for a first VR experience over a network to the plurality of first headsets in the first hierarchical logical relationship to provide the first VR experience; and transmitting information for a second VR experience over the network to the plurality of second headsets in the second hierarchical logical relationship to provide the second VR experience.

3. The method of claim 2 wherein transmitting information for the first VR experience and transmitting information for the second VR experience are performed to overlap in time.

4. The method of claim 3 wherein the first and second hierarchical logical relationships include information identifying VR content for each headset in the respective first and second hierarchical logical relationship, user login and authorization information for each headset in the respective first and second hierarchical logical relationship, and terms of use for each module.

5. A method to distribute and manage virtual reality (VR) content among a plurality of display apparatuses, the method comprising the steps of:

organizing virtual reality (VR) content housed in an administrator VR experience database into a plurality of virtual reality (VR) experiences, wherein each of the virtual reality (VR) experiences includes at least one virtual reality (VR) content module and a set of virtual reality (VR) content module execution instructions;

transmitting the plurality of virtual reality (VR) experiences over a network to the plurality of display apparatuses; and instructing at least one of the plurality of display apparatuses to execute the virtual reality (VR) content module execution instructions, such that the at least one virtual reality (VR) content module is presented on the respective display apparatus.

6. The method of claim 5 wherein:

the plurality of display apparatuses includes at least a first fleet of display apparatuses comprising at least one first fleet display apparatus and a second fleet of display apparatuses comprising at least one second fleet display apparatus; and the plurality of virtual reality (VR) experiences include a first virtual reality (VR) experience having a first plurality of virtual reality (VR) content modules and a first set of virtual reality (VR) content module execution instructions and a second virtual reality (VR) experience having a second plurality virtual reality (VR) content modules and a second set of virtual reality (VR) content module execution instructions.

7. The method of claim 6 wherein the step of transmitting the virtual reality (VR) experiences over a network to the plurality of display apparatuses further comprises:

transmitting the first virtual reality (VR) experience over the network to the at least one first fleet display apparatus, and wherein the at least one first fleet display apparatus presents the first plurality of virtual reality (VR) content modules to a first user; and transmitting the second virtual reality (VR) experience over the network to the at least one second fleet display apparatus, and wherein the at least one second fleet display apparatus presents the second plurality of virtual reality (VR) content modules to a second user.

8. The method of claim 7 wherein the first virtual reality (VR) experience is different than the second virtual reality (VR) experience.

9. The method of claim 8 wherein transmitting the first virtual reality (VR) experience over the network to the at least one first fleet display apparatus occurs during a first time interval and transmitting the second virtual reality (VR) experience over the network to the at least one second fleet display apparatus occurs during a second time interval; and wherein the first time interval and the second time interval overlap in time.

10. The method of claim 9 wherein the first time interval and the second time interval are the same.

11. The method of claim 7 wherein:

the first fleet of display apparatuses comprises at least a first apparatus and a second apparatus;

a first unique sub-set of virtual reality (VR) content modules of the first virtual reality (VR) experience is transmitted to the first apparatus, and the first unique sub-set of virtual reality (VR) content modules is secured via a first set of user login and authorization information; and a second unique sub-set of virtual reality (VR) content modules of the first virtual reality (VR) experience is transmitted to the second apparatus and the second unique sub-set of virtual reality (VR) content modules is secured via a second set of user login and authorization information.

12. The method of claim 11 wherein:

the first unique sub-set of virtual reality (VR) content modules of the first virtual reality (VR) experience is different than the second unique sub-set of virtual reality (VR) content modules of the first virtual reality (VR) experience; and the first set of user login and authorization information is different than the second set of user login and authorization information.

13. The method of claim 11 wherein:

the first apparatus is in a first geographical location and the second apparatus is in a second geographical location; and the first geographical location is different than the second geographical location.

14. The method of claim 11 further comprising:

receiving a first information set from the first apparatus relating to operation of the first virtual reality (VR) experience and receiving a second information set from the second apparatus relating to operation of the first virtual reality (VR) experience; and wherein each of the first information set and the second information set comprise at least one of messages from a user of the respective display apparatus, biometric data of the user of the respective display apparatus, or a content module completion status.

15. The method of claim 14 further comprising the steps of:

selectively transmitting the first information set to the second apparatus; and selectively transmitting the second information set to the first apparatus.

16. The method of claim 7 wherein:

the second fleet of display apparatuses comprises at least a first apparatus and a second apparatus;

a first unique sub-set of virtual reality (VR) content modules of the second virtual reality (VR) experience is transmitted to the first apparatus, and the first unique sub-set of virtual reality (VR) content modules is secured via a first set of user login and authorization information; and a second unique sub-set of virtual reality (VR) content modules of the second virtual reality (VR) experience is transmitted to the second apparatus and the second unique sub-set of virtual reality (VR) content modules is secured via a second set of user login and authorization information.

17. The method of claim 16 wherein first unique sub-set of virtual reality (VR) content modules of the second virtual reality (VR) experience is different than the second unique sub-set of virtual reality (VR) content modules of the second virtual reality (VR) experience.

18. The method of claim 16 wherein:
the first apparatus is in a first geographical location and the second apparatus is in a second geographical location; and
the first geographical location is different than the second geographical location.

19. The method of claim 16 further comprising:
receiving a first information set from the first apparatus relating to operation of the first virtual reality (VR) experience and receiving a second information set from the second apparatus relating to operation of the first virtual reality (VR) experience; and
wherein each of the first information set and the second information set comprise at least one of messages from a user of a respective display apparatus, biometric data of the user of the respective display apparatus, or a content module completion status.

20. The method of claim 19 further comprising the steps of:
selectively transmitting the first information set to the second apparatus; and
selectively transmitting the second information set to the first apparatus.

* * * * *